United States Patent
Bowers et al.

(10) Patent No.: US 8,240,848 B2
(45) Date of Patent: Aug. 14, 2012

(54) CONTACT LENS WITH SHADOW EFFECT

(75) Inventors: Angie Bowers, Jacksonville, FL (US); Diana Zanini, Jacksonville, FL (US); Dawn D. Wright, St. Augustine, FL (US); Daniel Austin, Cambridge (GB); Dafydd Geraint Davies, Cambridge (GB); Marta Dobrowolski, Cambridge (GB); Arti Krishna, Cambridge (GB); Siew Hoon Loke, Cambridge (GB); Alex Mackenzie, Cambridge (GB); Andrew Milton, Cambridge (GB); Julian Scarfe, Cambridge (GB)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 240 days.

(21) Appl. No.: 12/700,349

(22) Filed: Feb. 4, 2010

(65) Prior Publication Data

US 2011/0187991 A1    Aug. 4, 2011

(51) Int. Cl.
*G02C 7/04* (2006.01)
(52) U.S. Cl. .......... 351/159.19; 351/159.24; 351/159.73
(58) Field of Classification Search .................. 351/162, 351/159.19, 159.24–159.32, 159.73
See application file for complete search history.

(56) References Cited

U.S. PATENT DOCUMENTS

| | | | |
|---|---|---|---|
| 4,695,399 A * | 9/1987 | Neefe | 252/301.35 |
| 5,160,463 A * | 11/1992 | Evans et al. | 264/1.7 |
| 5,617,154 A | 4/1997 | Hoffman | |
| 5,757,458 A | 5/1998 | Miller et al. | |
| 5,963,298 A | 10/1999 | Bard | |
| 6,149,685 A | 11/2000 | Sigoloff | |
| 6,322,214 B1 * | 11/2001 | Atkins et al. | 351/162 |
| 7,246,903 B2 | 7/2007 | Bowers et al. | |
| 2003/0234906 A1 * | 12/2003 | Bensky | 351/162 |
| 2005/0237482 A1 * | 10/2005 | Jubin et al. | 351/160 R |
| 2010/0002189 A1 | 1/2010 | Bowers et al. | |

FOREIGN PATENT DOCUMENTS

WO    WO 2010002893 A2    1/2010

OTHER PUBLICATIONS

Johnson & Johnson Vision Care Inc., Entitled: Contact lens with Brightly Colored Sclera U.S. Appl. No. 12/700,376.
PCT International Search Report for PCT US2011/032860 Date of Mailing Dec. 5, 2011.

* cited by examiner

Primary Examiner — Darryl J Collins

(57) ABSTRACT

A contact lens with a central portion, an iris portion, and a peripheral portion disposed about the iris portion; wherein the iris portion contains an arcuate colored or tinted portion that provides a shadow effect; the peripheral portion can be colored white and can have a pattern that graduates to transparent towards the outer diameter of the lens.

12 Claims, 4 Drawing Sheets

CONTACT LENS WITH SHADOW EFFECT

BACKGROUND

Contact lenses can be colored or tinted to provide a variety of effects to the appearance of the eye. This can be done to correct a problem with the appearance of the eye or for cosmetic purposes. Such contact lenses can be used to enhance a particular aspect of one's appearance or even one's overall appearance. The invention is directed to contact lenses that perform these functions through a shadow effect.

It is desirable to retain the cosmetic lenses of the invention in a particular position on the eye, keep the lenses within a range of positions on eye, or return the lens to a particular position or range of positions after movement of the lens. This maintenance of the on-eye orientation of a lens typically is accomplished by altering the mechanical characteristics of the lens. Prism stabilization including decentering of the lens' front surface relative to the back surface, thickening of the inferior lens periphery, forming depressions or elevations on the lens' surface, and truncating the lens edge are examples of stabilization approaches. Additionally, dynamic stabilization has been used in which the lens is stabilized by the use of thin zones, or areas in which the thickness of the lens' periphery is reduced. Typically, the thin zones are located at two regions that are symmetric about either the vertical or horizontal axis of the lens from the vantage point of its on-eye placement.

SUMMARY OF THE INVENTION

The invention is a contact lens with a central portion and a peripheral portion disposed about the central portion. The peripheral portion contains a cosmetic pattern consisting of a colored or tinted portion (dark arc) that provides a shadow effect. This cosmetic pattern is located on the superior half of the lens, above the horizontal meridian. The peripheral portion can be colored white in areas other than the dark arc and can have a pattern that graduates to transparent towards the outer diameter of the lens. The invention is also a method of providing a shadow effect by providing a contact lens which contains a cosmetic pattern consisting of a colored or tinted portion.

DETAILED DESCRIPTION

The lenses of the invention have a cosmetic pattern that enhances the appearance of the lens wearer's eye and surrounding structures. In particular they provide a shadow effect. A "shadow effect" is an enhancement of the appearance of the upper eyelid margin and eyelashes of the upper eyelid. This can be achieved through providing the visual effect of making the upper eyelid appear to cast a shadow onto the eye or by making it appear that lashes are fuller, longer, have a different geometrical appearance, or have other desirable attributes than they would have otherwise. Without being bound to theory, the shadow effect is believed to result from a blending of a darkened portion of the lens periphery of particular dimensions, shape, and patterns with the darkened portion of the wearer's eyelid attributable to the wearer's own lashes or the portion of the eyelid to which the lashes are or are ordinarily affixed or to a shadow which may be attributable to the wearer's own lashes or the upper eyelid margin to which the lashes are affixed. This darkened portion is referred to as a "cosmetic pattern" throughout this specification. Again, without being bound to theory, the viewer's brain likely interprets the blending as attributable to the lash or lid margin thickness.

Figure 1:
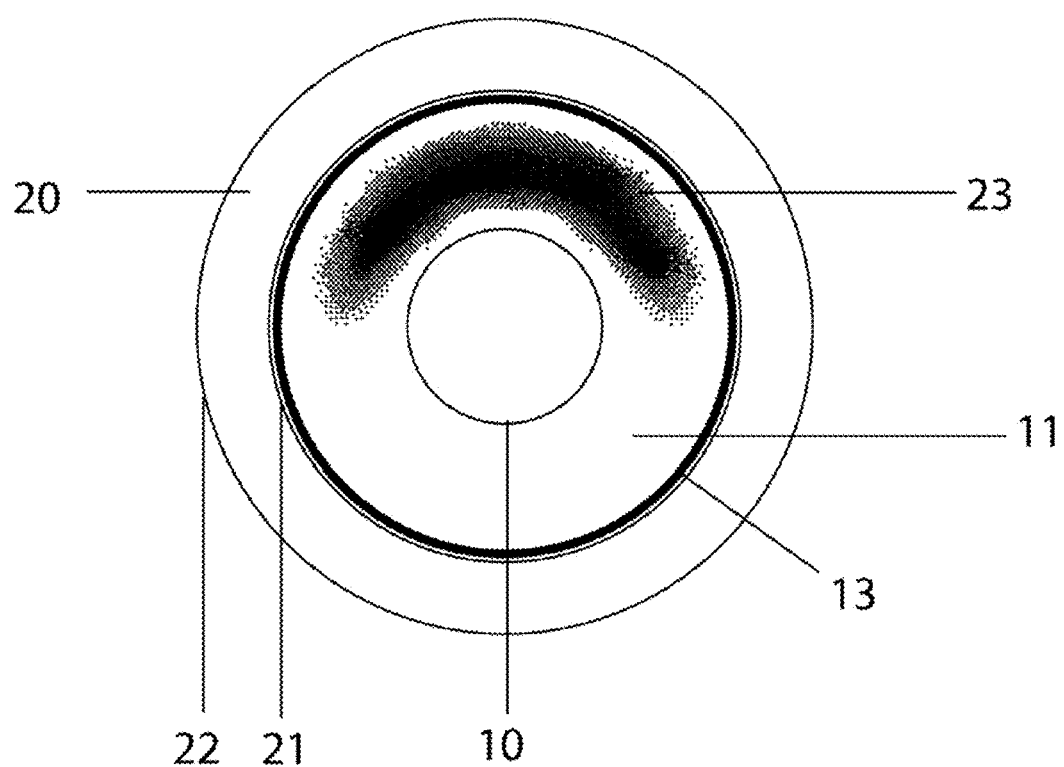
FIG. 1 is a front view of a contact lens according to the invention.

The lens shown in FIG. 1 is typically circular but can be any convenient shape for a contact lens such as an elliptical or truncated circular shape. The lens has a central portion 10. Disposed about the central portion 10 is the iris region 11. Disposed around the iris region, 11, and extending to the surrounding edge of the lens is a peripheral portion 20. The peripheral portion has an inner diameter 21 and an outer diameter 22 which can, but need not necessarily coincide with the outer edge of the lens as a whole. A cosmetic pattern, 23 lies in the superior part of the iris portion, 11, of the lens. The peripheral portion 20 can be clear and transparent or colored (e.g. white). The lens can also have a limbal ring or pattern, 13 that essentially separates the iris portion from the peripheral portion. The limbal ring, if it is present, can occupy the junction, 21, between the iris, 11 and peripheral portion, 20 of the lens, or it can partially overlap the outer portion of the iris zone, 11, or the inner portion of the peripheral zone, 20, or both. In any of the patterns of the invention, the center, 10 (pupil portion) preferably is clear. In a preferred embodiment, the pupil portion, 10, is clear and transparent to allow normal vision and a correction for ocular ametropia if necessary. In the most preferred embodiment of the invention, the only pattern or coloring in the iris portion, 11, is the arcuate cosmetic pattern, 23 except that the peripheral portion, 20 may be white in such preferred embodiment. Such an arrangement provides an excellent shadow effect. In another preferred embodiment, the lens may contain a limbal ring.

Referring again to FIG. 1, the lens can be divided by two imaginary lines. The horizontal bisector passes from one edge of the lens, through the center of the pupil portion, 10, the lens center, to the other side of the lens in a horizontal direction. The vertical bisector passes from one edge of the lens, through the center of the pupil portion, 10, the lens center, to the other side of the lens in a vertical direction. These imaginary bisector lines can also be applied to FIG. 2, FIG. 3 and FIG. 4.

The cosmetic pattern, 23, can provide the shadow effect. It is patterned and colored in the iris zone, 11 in the form of an arc. It need not be an arc of a circle as it can be an arc of an ellipse and in any case need not be symmetrical around the vertical bisector. It will, however, be an arc in the sense that it will have portions at both ends of the pattern that curve inward toward the center of the lens. This colored/tinted portion lies within the iris portion, 11 of the lens, superior to the center, 10, and superior to the horizontal bisector. It has dimensions as follows: no longer than 12 mm in horizontal width of pattern, no shorter than 7 mm in horizontal width of pattern, no taller than 8 mm in vertical height of pattern, no shorter than 4 mm in vertical height of pattern, no thicker than 6 mm, no thinner than 2 mm, where it is an arc of a circle it has a radius from 8 mm to 11 mm, in any event it takes no more than 50% of the space of the iris portion of the lens in the top half of the lens above the horizontal bisector, and no less than 25% on the same basis. The outer or horizontal edges of the cosmetic pattern may be rounded or tapered to end in a smooth fashion. The most superior portion of the cosmetic pattern should be between 1.5 mm and 3 mm from the outer diameter of the peripheral portion of the lens and between 0.5 mm and 2 mm from the inner diameter or, where used, limbal ring. The most inferior portion of the cosmetic pattern should be between 4 mm and 7 mm from the outer diameter of the peripheral portion of the lens and between 2 mm and 4 mm from the inner diameter or, where used, limbal ring. The desired effect results from a combination of the dimension, color and translucency of the pattern that provides the illusion of a shadow being cast by the wearers' eyelashes or upper eyelid margin. In a preferred embodiment, the eye enhancing effect should be visible at a distance of 5 feet or less, preferably 3 feet or less. Preferably, the color reflects natural colors (brown, black for darker eyes and grey, dark blue, dark green for lighter eyes) and may allow some of the natural iris to be visible either outside of or beneath the cosmetic pattern to provide an adequate, natural appearing, transition from pattern to natural iris. An adequate, natural appearing, transition from pattern to natural iris may be achieved in two ways. Firstly, it may be achieved via translucency. "Opaque" for these purposes means a color that permits an average light transmittance (% T) in the 380 to 780 nm range of 0 to about 50, preferably 7 to about 50% T. "Translucent" for these purposes means a color that permits an average light transmittance (% T) in the 380 to 780 nm range of about 50 to about 85%, preferably about 65 to about 85% T. Secondly, it may be achieved through cosmetic design. The cosmetic design can be blended by incorporating dots around the dark arc to blend the pattern.

The peripheral portion of the lens, 20 can be opaque, translucent, or somewhere between the two (semi-opaque). It is not necessary that it be uniformly colored either but embodiments according to the invention enhance its appearance, preferably, by providing the sclera with a refreshed, natural appearance. The lenses of the invention can also include other cosmetic features such as a limbal ring or limbal portion or even pattern elements that completely or partially overlie the wearer's iris. The shadow effect can also be attained, at least in part, through the combination of the dark arc cosmetic pattern in the superior portion of the lens periphery with the effect of the coloring of the remainder of the peripheral portion of the lens, the limbal ring, coloring or tinting of the iris portion of the lens, or a combination of these features. The combination of the cosmetic pattern and limbal ring tinting pattern creates a visual effect of emphasis on the darker portions of the iris thus exaggerating the effect of the cosmetic pattern. The combination of a lighter portion on the lower part of the lens and the dark arc cosmetic pattern print on the upper portion of the lens can also emphasize the effect of shadowing The "limbal ring" is an annular band of color that, when the lens is on-eye and centered, partially or completely overlies the lens wearer's limbal region, or the junction of the sclera with the cornea. The innermost border, or edge closest to the geometric center of the lens, of the limbal ring may form a circle having a diameter of about 6.5 mm to about 13 mm, preferably about 9 to about 11 mm, the circle being centered at the lens' geometric center. The ring may be of any suitable width and preferably is about 0.5 to about 3.5 mm in width, more preferably about 0.75 to about 1.25 mm in width.

Preferably both the iris and the limbal ring are patterned as in U.S. Pat. No. 7,246,903 which is incorporated herein by reference. Such coloring optionally includes substantially triangular-shaped structures that resemble spokes in a wheel extending inwardly from the innermost border of the limbal ring toward the geometric center of the lens. The tapered spokes may, but preferably do not, extend over the entire iris portion of the lens, meaning the portion of the lens that overlies the iris when the lens is on-eye and centered. Rather, preferably the spokes extend inwardly from the innermost edge of the limbal ring so that the innermost edge of the spoke pattern is located at about 6.5 mm or more, more preferably about 7 mm or more from the geometric center of the lens. The spokes may be of uniform or varying shapes and sizes and preferably are about 1 to about 2 mm in length.

Preferably the limbal ring element is a solid band of color that masks the color of the lens wearer's limbal region and more preferably the masking color is an opaque color. The remaining elements, the spokes, dots and other pattern elements, may be translucent or opaque depending on the desired on-eye result.

The color selected for each of the limbal ring and iris pattern elements are preferably determined by the natural color of the lens wearer's iris and the enhancement or color change desired. Thus, elements may be any color including, without limitation, any of a variety of hues and chromas of blue, green, gray, brown, black yellow, red, or combinations thereof. Preferred colors for the limbal ring include, without limitation, any of the various hues and chromas of black, brown, blue and gray.

Figure 2:
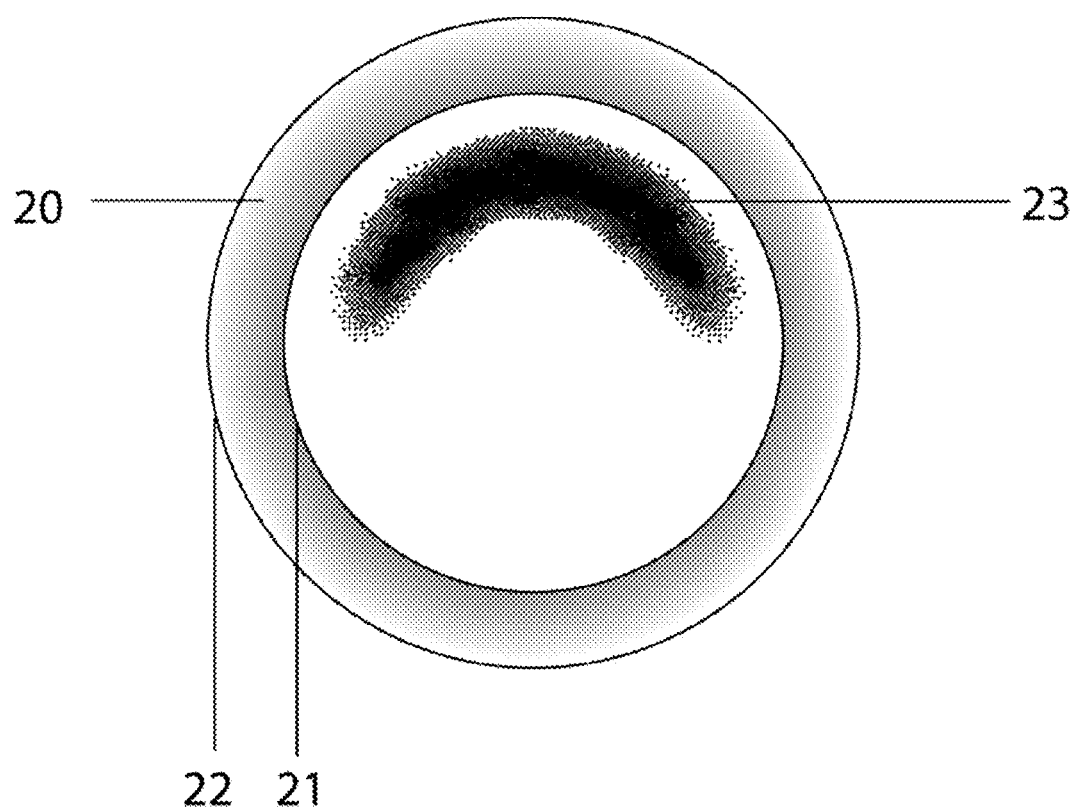
FIG. 2 is a front view of a contact lens according to the invention.

FIG. 2 shows an embodiment of the invention in which the coloring of the lens periphery, 20 is graduated from opaque to translucent or transparent from the inner diameter of the periphery, 21 to the outer diameter of the periphery, 22.

Figure 3:
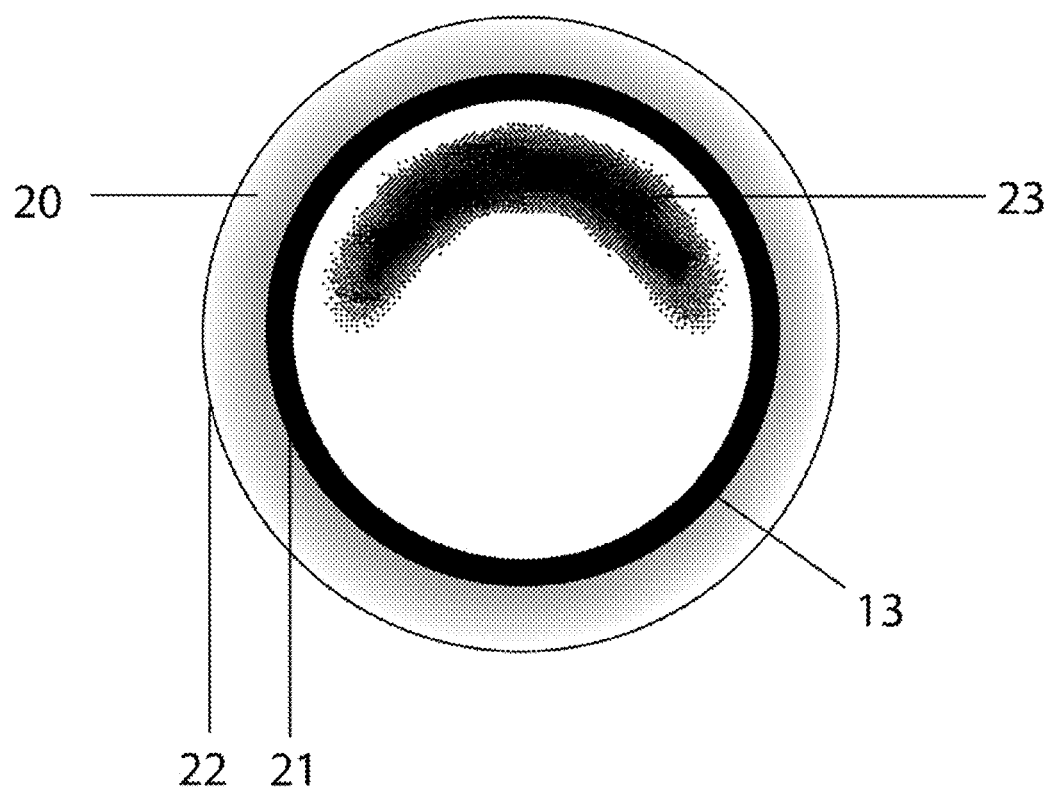
FIG. 3 is a front view of a contact lens according to the invention.

FIG. 3 shows an embodiment with a similar graduated coloring scheme but with the addition of a limbal ring, 13. FIG. 3 also shows an inventive lens with the colored portion and the white coloring applied to the periphery 20 in the form of a geometric pattern. In this case, the pattern takes on the appearance of circles removed from the lens surface (that would otherwise be colored white) so that each circle touches its neighboring circle at a tangent. It can also be thought of as rows and columns of cross shaped white structures formed by these circles.

Figure 4:
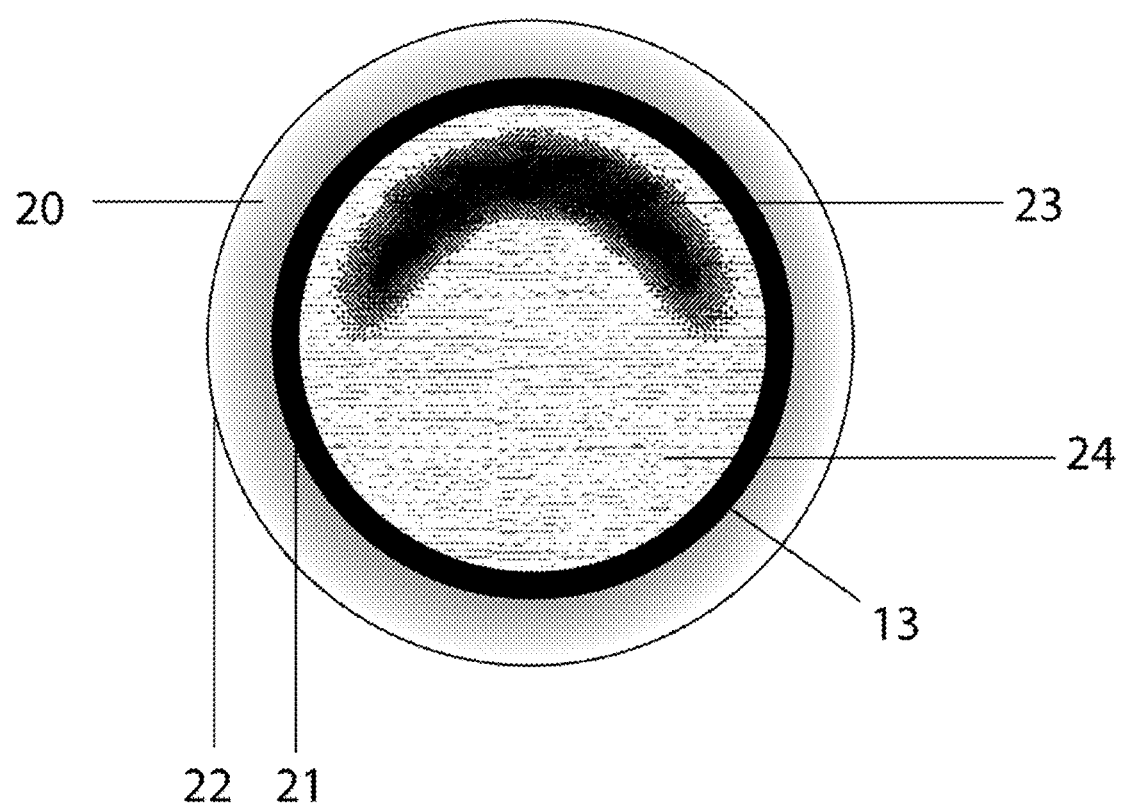
FIG. 4 is a front view of a contact lens according to the invention.

In FIG. 4, the lens of the invention has the same general scheme for patterning but the pupil and iris portion are also colored or tinted.

Contact lenses of this invention are most preferably stabilized. This can be accomplished with any of the well-known stabilization approaches for rotational stabilization. For example, a stabilization design that is a useful starting point is described in US Patent Publication 20050237482 which is incorporated herein by reference but any stabilization design can be used.

In general, the colored elements may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a pre-polymer, or binding polymer, and a solvent to form the colorant used to produce the translucent and opaque layers used in the lenses of the invention. Other additives useful in contact lens colorants also may be used. The binding polymers, solvents, and other additives useful in the color layers of the invention are known and either commercially available or methods for their making are known.

The elements may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene or polystyrene resin is used. The elements are deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The plate can also be made of ceramic materials. The elements are selected or designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about 20 microns. Alternately, the pattern can be applied to the plate by means of laser ablation or cavitation.

A colorant containing a binding polymer, solvent, and pigment or dye is then deposited onto the elements to fill the depressions with colorant. A silicone pad having a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays at least the limbal ring and dot patterns and preferably forms the entirety of the lens' outermost surface. The pre-polymer may be any polymer that is capable of dispersing the pigment and any opacifying agent used. It is also possible to apply the cosmetic patterns of this invention by means of ink jet printing. The ink jet printing may be applied to a clear pre-polymer layer or directly to the surface of a lens mold.

The invention may be used to provide tinted hard or soft contact lenses made of any known optical design, including non-corrective (piano), spherical, toric or multifocal designs. The invention may also be used to provide tinted hard or soft contact lenses made of any known lens-forming material, or material suitable for manufacturing such lenses. Preferably, the lenses of the invention are soft contact lenses, the material selected for forming the lenses being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens is made from a material containing a siloxane functionality, including, without limitation, polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof. Materials for making soft contact lenses are well known and commercially available. Preferably, the lens material is acquafilcon, etafilcon, genfilcon, lenefilcon, balafilcon, lotrafilcon, or galyfilcon. The lens may be further enhanced by using additives in the packing solution. An example of such an additive is polyvinylpyrollidine.

The invention is further described in the following nonlimiting examples.

Example 1

Clear Base Ink Composition Preparation

A binding polymer was made using 96 g of 1-dodecanethiol ("DODT"), 56.54 g lauryl methacrylate ("LMA"), 7.40 g methacrylic acid ("MAA"), 1367 g of hydroxyethylmethacrylate ("HEMA"), 68.5 g glycerol, 378 g 1-ethoxy-2-propanol ("EP"), 1511 g isopropyl lactate ("IPL") and 8.89 g 2,2'-azobis(2-methylbutyronitrile) ("AMBN"). First adding the DODT, monomers and solvents, except for about 50-100 cc of the IPL, were mixed in a 5 liter blue cap bottle and stirred for 10 minutes. The mixture was then poured into a 5 L stainless steel reactor with stirrer and nitrogen. The mixture was stirred and heated for approximately 25 min. until the temperature was 68° C. After the temperature was stabilized at 68° C., the AMBN was dissolved in the remaining IPL and added while opening the nitrogen bleed. The polymerization was allowed to proceed for 16-24 hours after which the temperature was increased to 80° C. and the reaction was completed. The mixture was then allowed to equilibrate to room temperature. The viscosity of the mixture was adjusted as desired by mixing 4 parts of IPL with 1 part of EP.

Example 2

Black Ink Preparation

A black pad printing ink was prepared by weighing 26.89 g. of primary black (comprised of 33.21 wt % black iron oxide pigment ($FeO.Fe_2O_3$, CAS #12227-89-3) in clear base as described in Example 1) into a 250 mL glass jar. 122.98 g. of clear base (described in Example 1) and 6 wt % 1-propanol was also added to the jar. The jar was placed under a mixer and mixed at 1800 rpm until the appearance of the ink was homogenous.

Example 3

Lens Fabrication with Dark Arcuate Cosmetic Pattern

A concave mold part with stabilization zones and a convex mold part was injection molded, from polystyrene, in ambient conditions (21% oxygen, 25° C.). The concave mold part was placed into a dry nitrogen tunnel inside the pad printer (approximately 180 seconds). The concave curves were pad printed, at 0.5% oxygen, first with a 15 μm deep full circle clear base ink composition (15 μm deep clear layer) and then with a 20 μm deep black ink composition. The mold was then returned to ambient conditions (21% oxygen, 25° C.) for approximately 20 seconds. The concave and convex curves were reconditioned at 2.8% oxygen for approximately 70 seconds. The printed concave mold part was then charged with 73 mg of etafilcon A reactive monomer mixture. The convex mold part was placed on top of the dosed reactive monomer mix and was subjected to precure weights (~200 grams) to ensure proper mold closure. The assemblies with precure weights were placed in a precure tunnel at 25° C. for 75 seconds with no lights to allow the monomer to penetrate the printed layers. The precure weights were removed and the curves were then placed in a curing tunnel with a controlled temperature (70° C.) and light intensity (370 to 440 nm) for about 4 minutes. The closed assembly was demolded and the lens was removed from the mold and any uncured monomers or dilutes were leached from the lens by immersion in DI Water and Tween combination at 70° C. (+/−5) for a minimum of 60 minutes. The lens was then equilibrated in a buffered saline solution, packaged and sterilized.

This example describes making a tinted contact lens that would provide a shadow effect when worn on eye.

We claim:

1. A contact lens comprising a central zone, an iris zone about the central zone, peripheral zone about the iris zone, a rotational stabilization feature, a horizontal bisector, a vertical bisector, and a shadow cosmetic pattern located only superior to the horizontal bisector in the iris zone, the cosmetic pattern being asymmetrical around the vertical bisector.

2. The contact lens of claim 1 wherein the central zone is transparent.

3. The contact lens of claim 1 wherein the cosmetic pattern is arcuate.

4. The contact lens of claim 1 wherein the lens is rotationally stabilized with thin zones located in the iris or peripheral zones.

5. The contact lens of claim 1 further comprising a limbal ring pattern.

6. The contact lens of claim 1 wherein the cosmetic pattern that gradually appears as opaque to translucent moving outward in the periphery of said lens.

7. The contact lens of claim 1 wherein the iris zone comprises a colored iris pattern.

8. The contact lens of claim 1 wherein the peripheral zone is tinted white.

9. A method of manufacturing a contact lens comprising a central zone, an iris zone about the central zone, a peripheral zone about the iris zone, a rotational stabilization feature, a horizontal bisector, a vertical bisector, and a shadow cosmetic pattern located only superior to the horizontal bisector in the iris zone, the cosmetic pattern is asymmetrical around the vertical bisector wherein the shadow cosmetic pattern is printed or lithographed.

10. The method of claim 9 wherein the cosmetic pattern is applied by pad printing.

11. The method of claim 9 wherein the cosmetic pattern is applied by ink jet printing.

12. The method of claim 9 wherein the cosmetic pattern is applied by photolithography.

* * * * *